(12) United States Patent
Hasegawa et al.

(10) Patent No.: US 10,286,514 B2
(45) Date of Patent: May 14, 2019

(54) SPINDLE CONDITION DETECTION DEVICE FOR MACHINE TOOL

(75) Inventors: Koji Hasegawa, Ichinomiya (JP); Koji Kito, Toyota (JP); Takashi Matsui, Toyoake (JP); Nobumitsu Hori, Ichinomiya (JP); Osamu Higashimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 1098 days.

(21) Appl. No.: 13/273,602

(22) Filed: Oct. 14, 2011

(65) Prior Publication Data

US 2012/0109539 A1  May 3, 2012

(30) Foreign Application Priority Data

Oct. 27, 2010 (JP) .................. 2010-241132

(51) Int. Cl.
*F16C 19/52* (2006.01)
*B23Q 17/00* (2006.01)
(Continued)

(52) U.S. Cl.
CPC .......... *B23Q 17/008* (2013.01); *F16C 19/522* (2013.01); *G01M 13/04* (2013.01);
(Continued)

(58) Field of Classification Search
CPC ...... G01M 1/22; G01M 13/04; G01M 13/045; G01M 13/027; G01D 3/08; G01P 21/00; F16C 19/52; F16C 19/00; F16C 19/364; F16C 33/36; F16C 19/527; F16C 13/02; F16C 2322/12; F16C 19/522; H03M 1/10; G01L 1/00; G07C 3/00; G05B 19/4065;
(Continued)

(56) References Cited

U.S. PATENT DOCUMENTS 5,287,031 A * 2/1994 Akiba et al. ................. 310/90.5
5,952,587 A * 9/1999 Rhodes et al. ........... 73/862.541
(Continued)

FOREIGN PATENT DOCUMENTS

DE 10 2004 048 649 A1 4/2006
DE 10 2007 036 271 A1 2/2009
(Continued)

OTHER PUBLICATIONS

Extended Search Report dated Feb. 24, 2012 in European Patent Application No. 11186735.4-2302.
(Continued)

*Primary Examiner* — Stephanie E Bloss
*Assistant Examiner* — Lisa E Peters
(74) *Attorney, Agent, or Firm* — Oblon, McClelland, Maier & Neustadt, L.L.P.

(57) ABSTRACT

A spindle condition detection device for a machine tool includes: bearing load detecting means for detecting a load on a bearing that rotatably supports a spindle of a machine tool; and present usage ratio calculating means for calculating, based on the load detected by the bearing load detecting means, a present usage ratio that is a ratio of usage of the bearing with respect to a prescribed operating life of the bearing, which is achieved over a period until a present moment.

12 Claims, 4 Drawing Sheets

(51) Int. Cl.
*G01M 13/04* (2019.01)
*G05B 19/4065* (2006.01)

(52) U.S. Cl.
CPC ...... *G05B 19/4065* (2013.01); *F16C 2233/00* (2013.01); *F16C 2322/39* (2013.01)

(58) Field of Classification Search
CPC ...... G05B 19/4184; G05B 2219/34477; G05B 2219/37253; G05B 2219/37254; G01H 1/003; B21B 38/008; B23Q 17/008
USPC ............ 702/184, 113, 181, 183, 34; 73/660, 73/865.9
See application file for complete search history.

(56) References Cited

U.S. PATENT DOCUMENTS

| | | | |
|---|---|---|---|
| 5,952,987 A * | 9/1999 | Browning et al. | 345/74.1 |
| 6,349,252 B1 * | 2/2002 | Imanishi et al. | 701/50 |
| 6,390,685 B1 * | 5/2002 | Shimomura et al. | 384/568 |
| 6,938,500 B2 * | 9/2005 | Beaman et al. | 73/862.49 |
| 7,006,953 B2 * | 2/2006 | Takemura et al. | 703/2 |
| 2004/0055398 A1 * | 3/2004 | Weyer et al. | 73/862.49 |
| 2004/0122618 A1 * | 6/2004 | Suzuki et al. | 702/181 |
| 2006/0171625 A1 * | 8/2006 | Jones et al. | 384/624 |
| 2008/0216576 A1 | 9/2008 | Eckert et al. | |
| 2009/0089033 A1 | 4/2009 | Ringering et al. | |
| 2010/0178001 A1 | 7/2010 | Matsunaga | |
| 2010/0180664 A1 | 7/2010 | Wilhelmy et al. | |

FOREIGN PATENT DOCUMENTS

| | | |
|---|---|---|
| EP | 2 026 157 A1 | 2/2009 |
| GB | 1 237 191 | 6/1971 |
| JP | 11-28644 | 2/1999 |
| JP | 2007-032712 A | 2/2007 |
| JP | 2008-019933 A | 1/2008 |
| JP | 2011-247660 A | 12/2011 |
| WO | WO 2007/006691 A1 | 1/2007 |

OTHER PUBLICATIONS

Office Action dated Mar. 1, 2013 in European Patent Application No. 11 186 735.4.
C. Carroll, "Lebensdauerberechnung", http://www.ibc-waelzlager.eu/file/Downloads/Lebensdauerberechnung.pdf, Feb. 19, 2010, pp. 148-159.
Office Action dated Mar. 11, 2014 in Japanese Patent Application No. 2010-241132 filed Oct. 27, 2010 (in English).

* cited by examiner

| ROTATIONAL SPEED RANGE (rpm) | LOAD RANGE (N) | PRESCRIBED OPERATING LIFE (h) | OPERATING TIME (h) | PRESENT USAGE RATIO (%) |
|---|---|---|---|---|
| 0~2000 | 0~1000 | 40,000 | 100 | 0.25 |
| | 1000~2000 | 38,000 | 300 | 0.79 |
| | 2000~3000 | 36,000 | 200 | 0.56 |
| | 3000~4000 | 34,000 | 400 | 1.18 |
| | 4000~5000 | 32,000 | 1,200 | 3.75 |
| 2000~4000 | 0~1000 | 36,000 | 200 | 0.56 |
| | 1000~2000 | 34,000 | 300 | 0.88 |
| | 2000~3000 | 32,000 | 600 | 1.88 |
| | 3000~4000 | 30,000 | 2,000 | 6.67 |
| | 4000~5000 | 28,000 | 800 | 2.86 |
| 4000~6000 | 0~1000 | 32,000 | 400 | 1.25 |
| | 1000~2000 | 30,000 | 600 | 2.00 |
| | 2000~3000 | 28,000 | 2,500 | 8.93 |
| | 3000~4000 | 26,000 | 1,200 | 4.62 |
| | 4000~5000 | 24,000 | 500 | 2.08 |
| 6000~8000 | 0~1000 | 28,000 | 1,000 | 3.57 |
| | 1000~2000 | 26,000 | 400 | 1.54 |
| | 2000~3000 | 24,000 | 100 | 0.42 |
| | 3000~4000 | 22,000 | 80 | 0.36 |
| | 4000~5000 | 20,000 | 40 | 0.20 |
| | | Total | 12,920 | 44.33 |

Fig. 2

| LOAD RATIO RANGE (%) | PRESCRIBED OPERATING LIFE (h) | OPERATING TIME (h) | PRESENT USAGE RATIO (%) |
|---|---|---|---|
| 40~50 | 80,000 | 2,430 | 3.04 |
| 50~60 | 46,000 | 3,370 | 7.33 |
| 60~70 | 29,000 | 2,500 | 8.62 |
| 70~80 | 19,000 | 4,200 | 22.11 |
| 80~90 | 13,000 | 420 | 3.23 |
| 90~100 | 10,000 | 0 | 0.00 |
|  | Total | 12,920 | 44.33 |

SPINDLE CONDITION DETECTION DEVICE FOR MACHINE TOOL

INCORPORATION BY REFERENCE

This application claims priority to Japanese Patent Application No. 2010-241132 filed on Oct. 27, 2010 the disclosure of which, including the specification, drawings and abstract, is incorporated herein by reference in its entirety.

BACKGROUND OF THE INVENTION

1. Field of the Invention

The invention relates to a unit that detects a condition related to the operating life of a spindle of a machine tool.

2. Discussion of Background

For example, Japanese Patent Application Publication No. 11-28644 describes a method for managing maintenance of a spindle of a machine tool. According to Japanese Patent Application Publication No. 11-28644, a load on a spindle is detected by using a current sensor or a torque sensor provided at a spindle motor, the operating time of the spindle is accumulated for each level of load, and then each of the accumulated operating times is converted into operating time at a reference load level. Then, a relevant part is replaced if the total operating time obtained by adding up the operating times obtained through conversion has reached a reference value. According to this technique, operators are able to realize that, for example, a spindle taper portion of the spindle has reached the end of its operating life, allowing proper maintenance of the spindle taper portion.

According to the technique described in Japanese Patent Application Publication No. 11-28644, the operators are able to realize that the spindle has reached the end of its operating life. However, the inventors have found it important to ascertain, for example, the remaining operating life of the spindle at the present moment. In particular, ascertaining a present condition related to the operating life of the spindle may contribute to an increase in the machining efficiency. In addition, the inventors have found it most important to ascertain the operating life of a bearing that rotatably supports a spindle of a machine tool, and thus considered that it is necessary to ascertain a condition related to the operating life of the bearing for the spindle at the present moment.

SUMMARY OF THE INVENTION

The invention is made in light of the above-described circumstances, and it is an object of the invention to provide a spindle condition detection device for a machine tool, which makes it possible to appropriately ascertain a condition related to the operating life of a bearing for a spindle.

According to a feature of an example of the invention, "present usage ratio" that is achieved over a period until the present moment is newly introduced as an indicator, and the present usage ratio is calculated based on the load on the bearing. Because the present usage ratio is obtained, the operators are able to ascertain the present condition of the bearing in regard to its operating life. Accordingly, it is possible to increase the machining efficiency by changing the use conditions of the spindle, such as the rotational speed of the spindle and the cutting depth, in consideration of the present usage ratio and the machining manner or method employed so far.

Meanwhile, even if the load on the bearing is the same, the influence on the operating life of the bearing varies depending on the rotational speed of the spindle. More specifically, if the load on the bearing is the same, the higher the rotational speed of the spindle is, the shorter the operating life of the bearing is. According to another feature of an example of the invention, the present usage ratio of the bearing is calculated using the load on the bearing and the rotational speed of the spindle, which achieves a higher accuracy in the calculation of the present usage ratio of the bearing.

According to a further feature of an example of the invention, it is possible to determine whether the end of the operating life of the bearing has been reached.

According to another feature of the invention, if the same usage conditions as those in the predetermined past period are continued, the remaining operating life of the bearing is ascertained. For example, in a case where a large number of workpieces of the same type are machined, the calculated remaining operating life is accurate. Even in a case where workpieces of various types are machined in small groups, the calculated remaining operating life may be used as a guide. As described above, because the remaining operating life is thus obtained, it is possible to properly determine when to start preparation for maintenance. The predetermined past period may be set as needed based on, for example, the type of workpiece and the time required to machine each workpiece. For example, the predetermined past period may be a limited past period, such as one month, three months, and one year, or may be the whole period from the beginning of use to the present.

Further, by way of example, according to another aspect of the invention, the present usage ratio of the bearing is calculated reliably and easily.

According to a further feature of an example of the invention, the present usage ratio of the bearing is displayed according to the rotational speed of the spindle. This encourages the operators to reconsider the machining manner or method employed so far, that is, suggests the need for changes in the machining conditions, such as the rotational speed of the spindle and the cutting depth, in order to increase the machining efficiency.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a table related to a present usage ratio in a first example embodiment;

DETAILED DESCRIPTION OF EMBODIMENTS

Hereinafter, example embodiments of the invention will be described with reference to the accompanying drawings.

Figure 1:
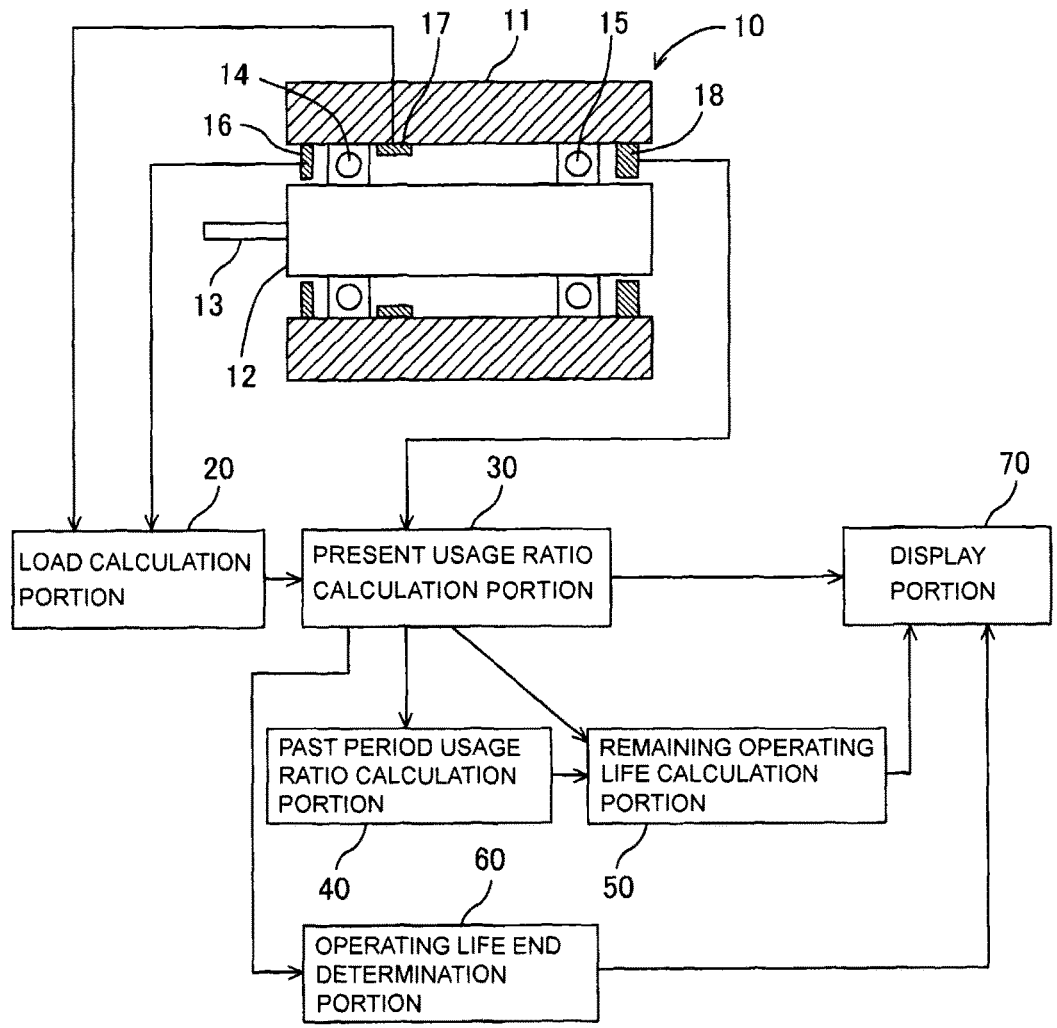
FIG. 1 is a view showing the configuration of a spindle condition detection device for a machine tool according to the invention.

A spindle condition detection device for a machine tool according to a first example embodiment will be described with reference to FIGS. 1 to 3. As shown in FIG. 1, the spindle condition detection device for a machine tool includes a spindle unit 10, a load calculation portion 20, a present usage ratio calculation portion 30, a past period usage ratio calculation portion 40, a remaining operating life calculation portion 50, an operating life end determination portion 60, and a display portion 70.

The spindle unit 10 includes a cylindrical housing 11, a spindle 12 that is rotatably supported at a position radially inward of the housing 11, a cutting tool 13 attached at an axial end of the spindle 12, a first bearing 14 and a second bearing 15 that support the spindle 12 such that the spindle 12 is rotatable relative to the housing 11, a radial displacement sensor 16 that detects a radial displacement of the spindle 12 with respect to the housing 11, an axial displacement sensor 17 that detects an axial displacement of the spindle 12 with respect to the housing 11, and a rotational speed sensor 18 that detects the speed at which the spindle 12 rotates relative to the housing 11.

The load calculation portion 20 calculates the load on the first bearing 14 based on the radial displacement of the spindle 12 with respect to the housing 11, which is detected by the radial displacement sensor 16, and the axial displacement of the spindle 12 with respect to the housing 11, which is detected by the axial displacement sensor 17. The loads acting in the directions of the normals to the points at which respective balls, which are rolling elements of the first bearing 14, contact an outer ring or an inner ring of the first bearing 14 are determined as the load on the first bearing 14. Because the radial displacement sensor 16 and the axial displacement sensor 17 are arranged near the first bearing 14, it is possible to calculate the load on the first bearing 14 with a high degree of accuracy. It is to be noted that the load on the second bearing 15 may be calculated in addition to the load on the first bearing 14. However, the first bearing 14 is the target of the operating life determination in the first example embodiment.

The present usage ratio calculation portion 30 calculates a usage ratio that is a ratio of usage of the first bearing 14 with respect to the prescribed operating life of the first bearing 14, which is achieved over a period from the beginning of use until the present moment, based on the load on the first bearing 14, which is calculated by the load calculation portion 20, and the rotational speed of the spindle 12, which is detected by the rotational speed sensor 18. This usage ratio achieved over the period from the beginning of use until the present moment signifies the ratio of the usage of the first bearing 14 over the period from the beginning of use until the present moment, with respect to the usage of the first bearing 14 from the beginning of use to the end of the operating life at which the usage ratio reaches 100%. In the following descriptions, the usage ratio of the first bearing 14 over the period from the beginning of use until the present moment will be referred to as "present usage ratio".

The method for calculating the present usage ratio will be described in detail with reference to FIG. 2. The numerical ranges indicated in the first to third left columns of the table in FIG. 2 are preset in the present usage ratio calculation portion 30. More specifically, as shown in the first left column of the table in FIG. 2, the range of rotational speeds of the spindle 12 is divided into multiple rotational speed ranges. In the example case illustrated in FIG. 2, it is divided into four ranges of: from 0 rpm to 2000 rpm; from 2000 rpm to 4000 rpm; from 4000 rpm to 6000 rpm; and from 6000 rpm to 8000 rpm. Further, as shown in the second left column of the table in FIG. 2, the range of loads on the first bearing 14 is divided into multiple load ranges for each rotational speed range. In the example case illustrated in FIG. 2, the load range is divided into five ranges of: from 0 N to 1000 N, from 1000 N to 2000 N, from 2000 N to 3000 N, from 3000 N to 4000 N, and from 4000 N to 5000 N. These five load ranges are set for each of the four rotational speed ranges of the spindle 12. That is, 20 load ranges are set in total. Further, as shown in the third left column of the table in FIG. 2, a prescribed operating life of the first bearing 14 is set in advance for each of the load ranges for each of the rotational speed ranges, i.e., each of the 20 load ranges.

As is understood from the table, even if the load on the first bearing 14 is the same, the higher the rotational speed of the spindle 12 is, the shorter the prescribed operating life of the first bearing 12 is. For example, the prescribed operating life in a case where the rotational speed range of the spindle 12 is from 0 rpm to 2000 rpm and the load range is from 0 N to 1000 N is 40000 hours, whereas the prescribed operating life in a case where the spindle rotational speed range is from 6000 rpm to 8000 rpm and the load range is from 0 N to 1000 N is 28000 hours. As described above, the prescribed operating life of the first bearing 14 varies depending upon not only the load on the first bearing 14 but also the rotational speed of the spindle 12.

The present usage ratio calculation portion 30 calculates the operating time in each of the load ranges for each of the rotational speed ranges, based on the load on the first bearing 14, which is calculated by the load calculation portion 20, and the rotational speed of the spindle 12, which is detected by the rotational speed sensor 18. As shown in the fourth left column of the table in FIG. 2, the operating time in each of the load ranges for each of the rotational speed ranges is accumulated. The operating time thus calculated for each load range is an accumulated value of the operating time in the period from the beginning of use until the present moment. For example, in the example case illustrated in FIG. 2, the operating time (as accumulated from the beginning of use until the present moment) in a case where the spindle rotational speed range is from 0 rpm to 2000 rpm and the load range is from 0 to 1000 N is 100 hours, and the operating time in a case where the spindle rotational speed range is from 6000 rpm to 8000 rpm and the load range is from 0 N to 1000 N is 1000 hours.

Further, as shown in the fifth left column of the table in FIG. 2, the present usage ratio calculation portion 30 calculates the usage ratio in each of the load ranges for each of the rotational speed ranges (will hereinafter be referred to as "divisional usage ratio") by dividing the operating time by the prescribed operating life. It is to be noted that each usage ratio indicated in the table in FIG. 2 is rounded off to two decimal places. For example, in the example case illustrated in FIG. 2, the divisional usage ratio (as calculated from the beginning of use until the present moment) in a case where the spindle rotational speed range is from 0 rpm to 2000 rpm and the load range is from 0 N to 1000 N is 0.25%, and the divisional usage ratio in a case where the spindle rotational speed range is from 6000 rpm to 8000 rpm and the load range is from 0 N to 1000 N is 3.5714% (rounded off to two decimal places, that is, 3.57% in the table of FIG. 2). Further, as shown in the bottom row of the table of FIG. 2, the present usage ratio calculation portion 30 calculates the present usage ratio by summing up all the divisional usage ratios. In the example case illustrated in FIG. 2, the present usage ratio is 44.3257% (rounded off to two decimal places, that is, 44.33% in the table of FIG. 2).

The past period usage ratio calculation portion 40 calculates a ratio of usage of the first bearing 14 in a predetermined past period with respect to the prescribed operating life of the first bearing 14 (will hereinafter be referred to as "past period usage ratio"). The predetermined past period may be set to any period. For example, the predetermined past period may be a limited past period, such as one month, three months, and one year, or may be the whole period from the beginning of use until the present moment. In this example embodiment, if the operating life of the first bearing 14 is approximately two years, the predetermined past period is set to three months, for example. Preferably, the predetermined past period is set to a period suitable for determining the most recent use conditions of the machine tool and predicting future use conditions of the machine tool.

The remaining operating life calculation portion 50 calculates a remaining operating life of the first bearing 14 based on the past period usage ratio and the present usage ratio. For example, if the present usage ratio is 44.33% and the past period usage ratio calculated over the last three months is 10%, the remaining operating life is (100−44.33)/10×3=16.701 (months).

The operating life end determination portion 60 determines whether the present usage ratio has reached 100%. If the present usage ratio has reached 100%, the operating life end determination portion 60 determines that the end of the operating life of the first bearing 14 has been reached.

Figures 3, 4:
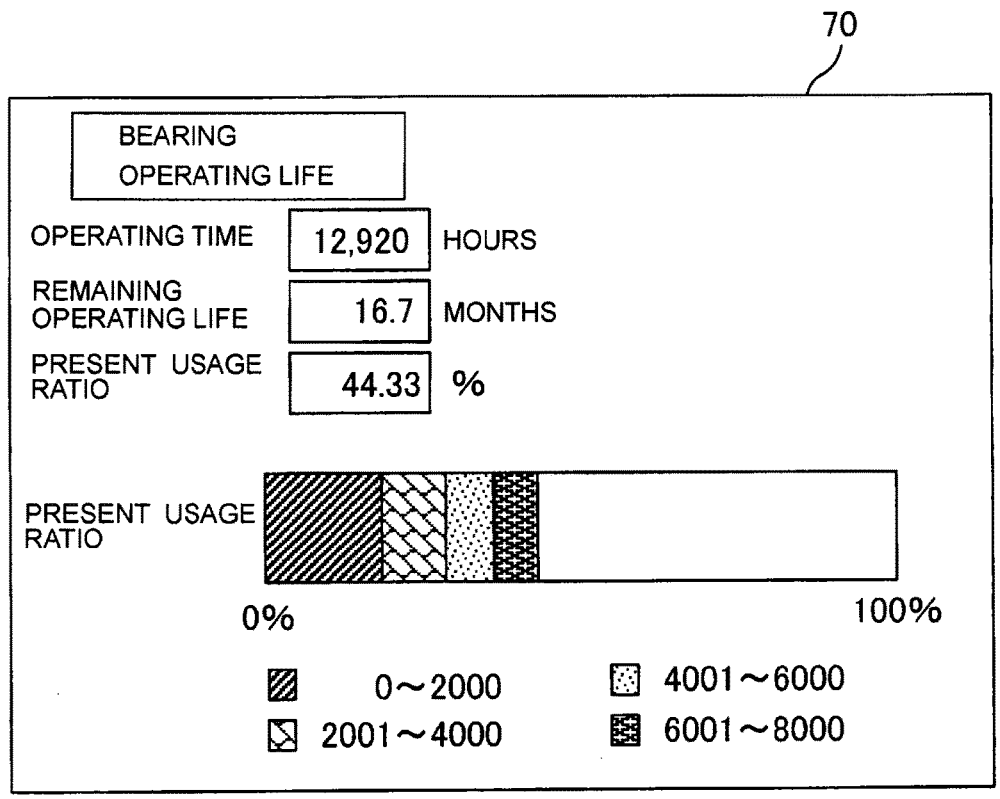
FIG. 3 is a view showing a display screen of a display portion.
FIG. 4 is a graph related to a present usage ratio in a second example embodiment.

As shown in FIG. 3, various pieces of information are displayed in the display screen of the display portion 70. More specifically, a sign "END OF BEARING LIFE" lights up or blinks at the uppermost row of the display screen of the display portion 70 when the operating life end determination portion 60 determines that the end of the operating life of the first bearing 14 has been reached. Further, the display screen of the display portion 70 also displays the operating time and present usage ratio calculated by the present usage ratio calculation portion 30. Further, the display screen of the display portion 70 displays the remaining operating life (indicated in months in the example case illustrated in FIG. 3) calculated by the remaining operating life calculation portion 50. Further, the display portion 70 displays a graph showing the present usage ratio in each rotational speed range, which is created based on the information obtained from the present usage ratio calculation portion 30.

According to the first example embodiment, the present usage ratio of the first bearing 14 is calculated based on the load on the first bearing 14 and the rotational speed of the spindle 12. Because the present usage ratio is obtained, the operators are able to ascertain the present condition of the first bearing 14 in regard to its operating life. Accordingly, it is possible to increase the machining efficiency by changing the machining conditions of the spindle 12, such as the rotational speed of the spindle 12 and the cutting depth, in consideration of the present usage ratio and the machining manner or method employed so far.

Further, as described above, not only the load on the first bearing 14 but also the rotational speed of the spindle 12 is used to calculate the present usage ratio of the first bearing 14. Even if the load on the first bearing 14 is the same, the influence on the operating life of the first bearing 14 varies depending on the rotational speed of the spindle 12. More specifically, if the load on the first bearing 14 is the same, the higher the rotational speed of the spindle 12 is, the shorter the operating life of the first bearing 14 is. In view of this, if not only the load on the first bearing 14 but also the rotational speed of the spindle 12 is used to calculate the present usage ratio of the first bearing 14, the present usage ratio of the first bearing 14 is calculated at a higher degree of accuracy.

Further, the remaining operating life of the first bearing 14 is calculated. If the same usage conditions as those in the predetermined past period are continued from now, the remaining operating life of the first bearing 14 is the one indicated on the display screen. For example, in a case where a large number of workpieces of the same type are machined, the calculated remaining operating life is accurate. Even in a case where workpieces of various types are machined in small groups, the calculated remaining operating life may be used as a guide. As described above, because the remaining operating life is thus obtained, it is possible to properly determine when to start preparation for maintenance.

Further, the display portion 70 displays the present usage ratio of the first bearing 14 based on the rotational speed of the spindle 12. This encourages the operators to reconsider the machining manner or method employed so far, that is, suggests the need for changes in the machining conditions, such as the rotational speed of the spindle 12 and the cutting depth, in order to increase the machining efficiency.

Figure 5:
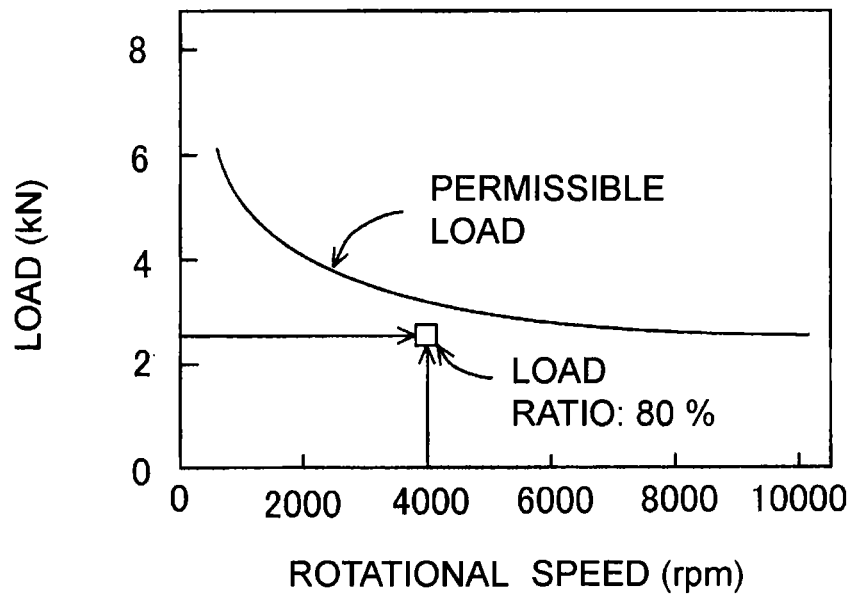
FIG. 5 is a table that illustrates a relation between a rotational speed of a spindle and a permissible load of a bearing, and is used to explain "load ratio"
Figure 6:
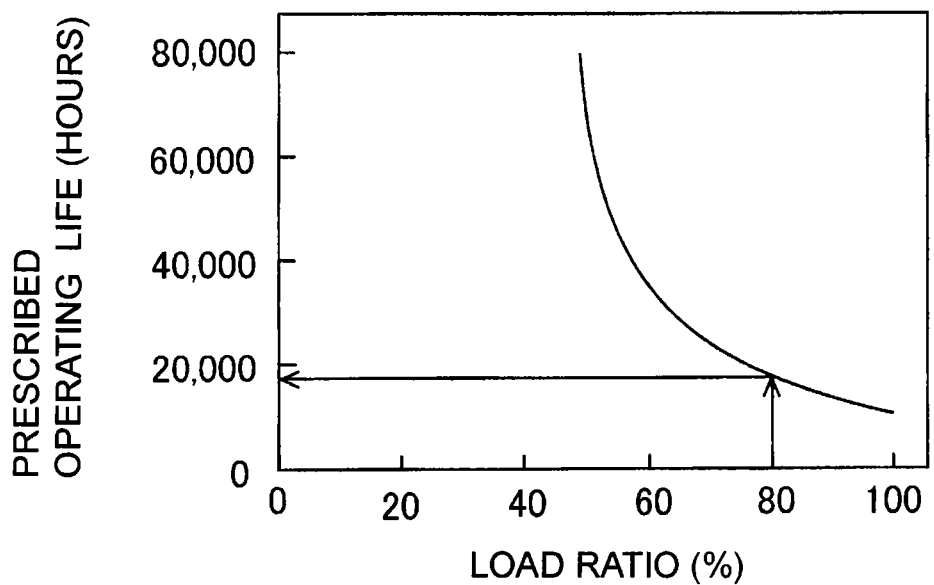
FIG. 6 is a graph illustrating a relation between the load ratio and a prescribed operating life.

Next, a spindle condition detection device for a machine tool according to a second example embodiment of the invention will be described with reference to FIGS. 4 to 6. The spindle condition detection device for a machine tool according to the second example embodiment is different from that according to the first example embodiment in the method in which the present usage ratio calculation portion 30 calculates the present usage ratio. In the following, therefore, only the method of calculating the present usage ratio will be described.

In the second example embodiment, the present usage ratio calculation portion 30 calculates the present usage ratio that is a ratio of usage of the first bearing 14 with respect to its prescribed operating life, based on the load on the first bearing 14, which is calculated by the load calculation portion 20, and the rotational speed of the spindle 12, which is detected by the rotational speed sensor 18.

The method of calculating the present usage ratio will be described in more detail with respect to FIGS. 4 to 6. The numerical ranges indicated in the first and second left columns of the table in FIG. 4 are preset in the present usage ratio calculation portion 30. More specifically, as shown in the first left column of the table in FIG. 4, the range of "load ratio" of the first bearing 14 is divided into multiple load ratio ranges. In the example case illustrated in FIG. 4, it is divided into six ranges of: from 40% to 50%, from 50% to 60%, from 60% to 70%, from 70% to 80%, from 80% to 90%, and from 90% to 100%.

Next, "load ratio" will be described with reference to FIG. 5. Illustrated in the graph of FIG. 5 is a relation between the rotational speed of the spindle 12 and the permissible load of the first bearing 14. As shown in FIG. 5, the lower the rotational speed of the spindle 12 is, the higher the permissible load of the first bearing 14 is, in other words, the higher the rotational speed of the spindle 12 is, the lower the permissible load of the first bearing 14 is. The permissible load of the first bearing 14 is the level of load on the first bearing 14 at which the prescribed operating life is 10000 hours, and the permissible load corresponds to a load ratio of 100%. That is, the load ratio of the first bearing 14 is the ratio of the actual load on the first bearing 14 to the permissible load of the first bearing 14. For example, as shown in FIG. 5, in a case where the rotational speed of the spindle 12 is 4000 rpm and the load on the first bearing 14 is 2400 N, the permissible load is 3000 N and the load ratio is 80%.

Further, as shown in the second left column of the table in FIG. 4, the prescribed operating life of the first bearing 14 is preset for each load ratio range. Hereinafter, the prescribed operating life will be described with reference to FIG. 6. Illustrated in the graph in FIG. 6 is a relation between the load ratio and the prescribed operating life. As shown in FIG. 6, the lower the load ratio is, the longer the prescribed operating life is, in other words, the higher the load ratio is, the shorter the prescribed operating life is. For example, the prescribed operating life in a case where the load ratio is 80% is 19000 hours.

Further, the present usage ratio calculation portion 30 calculates the operating time in each load ratio range, based on the load on the first bearing 14, which is calculated by the load calculation portion 20, and the rotational speed of the spindle 12, which is detected by the rotational speed sensor 18. The operating time in each load ratio range is accumulated as indicated in the third left column of the table in FIG. 4. Note that, the operating time is an accumulated value achieved over the period from the beginning of use until the present moment. In the example case illustrated in FIG. 4, the operating time in a case where the load ratio range is from 60% to 70% (as accumulated from the beginning of use until the present moment) is 2500 hours, and the operating time in a case where the load ratio range is from 70% to 80% is 4200 hours.

Further, as shown in the fourth left column of the table in FIG. 4, the present usage ratio calculation portion 30 calculates the usage ratio in each load ratio range (will hereinafter be referred to as "divisional usage ratio") by dividing the operating time by the prescribed operating life. In the example case illustrated in FIG. 4, the divisional usage ratio in a case where the load ratio range is from 60% to 70% (as calculated over the period from the beginning of use until the present moment) is 8.62%, and the divisional usage ratio in a case where the load ratio range is from 70% to 80% is 22.11%. Further, as indicated at the bottom row of the table in FIG. 4, the present usage ratio calculation portion 30 calculates the present usage ratio by summing up all the divisional usage ratios. In the example case illustrated in FIG. 4, the present usage ratio is 44.33%. Accordingly, in the second example embodiment, too, it is possible to reliably calculate the present usage ratio.

What is claimed is:

1. A machine tool including a spindle condition detection device, comprising:
    a spindle;
    a bearing that rotatably supports the spindle;
    a bearing load detector that detects a load on the bearing;
    a rotational speed sensor that detects a rotational speed of the spindle; and
    a present usage ratio calculation portion that calculates a present usage ratio based on at least one load that is detected by the bearing load detector,
    wherein the present usage ratio calculation portion:
        divides a range for the rotational speed of the spindle into multiple rotational speed ranges, divides a range for the load on the bearing into a set of load ranges for each rotational speed range,
        presets, for each load range of each rotational speed range, a prescribed operating life of the bearing,
        calculates an operating time in each load range for each rotational speed range from a beginning of use to a present moment, based on loads detected by the bearing load detector and rotational speeds detected by the rotational speed sensor,
        calculates, for each load range of each rotational speed range, a divisional usage ratio of the bearing by dividing a respective operating time by a respective prescribed operating life, and
        calculates the present usage ratio by summing up all the divisional usage ratios.

2. The machine tool according to claim 1, further comprising:
    an operating life end determination portion to determine the end of a prescribed operating life of the bearing is reached when the present usage ratio has reached 100%.

3. The machine tool according claim 1, further comprising:
    a past period usage ratio calculation portion to calculate a ratio of usage of the bearing in a predetermined past period with respect to a prescribed operating life of the bearing; and
    a remaining operating life calculation portion to calculate a remaining operating life of the bearing to the end of the prescribed operating life of the bearing, based on the ratio of usage in the predetermined past period and the present usage ratio.

4. The machine tool according to claim 1, further comprising:
    a display portion to display the present usage ratio according to a rotational speed of the spindle.

5. The machine tool according to claim 1, wherein the bearing load detector includes an axial displacement sensor to detect axial displacement of the spindle and a radial displacement sensor to detect radial displacement of the spindle.

6. The machine tool according to claim 1,
    wherein a present usage of the bearing from beginning of use to the present moment includes an operating time at a first load range and a first rotational speed range, and
    wherein the prescribed operating life of the bearing from the beginning of use to the end of the operating life of the bearing includes a prescribed operating life time at the first load range and the first rotational speed range.

7. A machine tool including a spindle condition detection device, comprising:
    a spindle;
    a bearing that rotatably supports the spindle;
    a bearing load detector that detects a load on the bearing;
    a rotational speed sensor that detects a rotational speed of the spindle; and
    a present usage ratio calculation portion that calculates a present usage ratio based on at least one load that is detected by the bearing load detector,
    wherein the present usage ratio calculation portion:
        presets a permissible load of the bearing with respect to a rotational speed of the spindle, divides a range for a ratio of present load with respect to the permissible load into multiple load ratio ranges, and presets a prescribed operating life of the bearing for each load ratio range,
        calculates a ratio of present load with respect to the permissible load and an operating time for each load ratio range from a beginning of use to a present moment, based on loads detected by the bearing load detector and rotational speeds detected by the rotational speed sensor, calculates, for each load ratio range, a divisional usage ratio of the bearing by dividing a respective operating time by a respective prescribed operating life, and calculates the present usage ratio by summing up all the divisional usage ratios.

8. The machine tool according to claim 7, further comprising:

an operating life end determination portion to determine the end of a prescribed operating life of the bearing is reached when the present usage ratio has reached 100%.

9. The machine tool according claim 7, further comprising:

a past period usage ratio calculation portion to calculate a ratio of usage of the bearing in a predetermined past period with respect to a prescribed operating life of the bearing; and a remaining operating life calculation portion to calculate a remaining operating life of the bearing to the end of the prescribed operating life of the bearing, based on the ratio of usage in the predetermined past period and the present usage ratio.

10. The machine tool according to claim 7, further comprising:

a display portion to display the present usage ratio according to a rotational speed of the spindle.

11. The machine tool according to claim 7, wherein the bearing load detector includes an axial displacement sensor to detect axial displacement of the spindle and a radial displacement sensor to detect radial displacement of the spindle.

12. The machine tool according to claim 7, wherein a present usage of the bearing from beginning of use to the present moment includes an operating time at a first load range and a first rotational speed range, and wherein the prescribed operating life of the bearing from the beginning of use to the end of the operating life of the bearing includes a prescribed operating life time at the first load range and the first rotational speed range.

\* \* \* \* \*